UNITED STATES PATENT OFFICE.

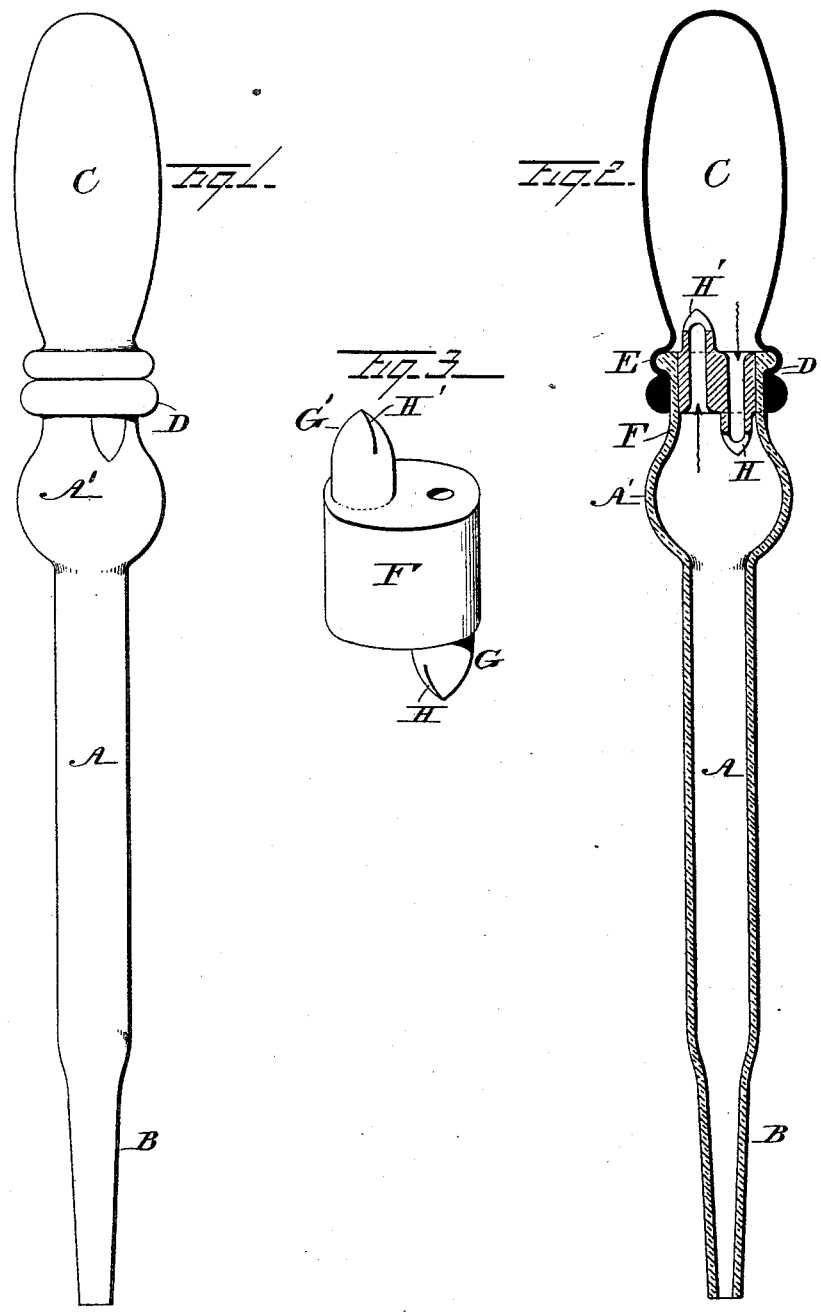

WALTER F. WARE, OF CAMDEN, NEW JERSEY.

MEDICINE-DROPPER AND EYE-PIPETTE.

SPECIFICATION forming part of Letters Patent No. 424,632, dated April 1, 1890.

Application filed November 16, 1889. Serial No. 330,635. (No model.)

*To all whom it may concern:*

Be it known that I, WALTER F. WARE, of the city of Camden and State of New Jersey, have invented a certain new and useful Improvement in Medicine-Droppers and Eye-Pipettes; and I do hereby declare the following to be a full, clear, and exact description thereof, reference being had to the accompanying drawings, forming part of this specification.

My invention has relation to devices for dropping medicines, and particularly to eye-pipettes; and it consists in a dropper having a double valve provided in the upper extremity of the barrel at or about its point of juncture and connection with the rubber compression-cap or device for expelling the air from the barrel.

In the manufacture of india-rubber, of which the compression-cap is usually made, it is necessary to use some sulphur to properly vulcanize it. In many instances manufacturers, in order to cheapen the rubber, will use whiting, lead, lamp-black, and other articles in a compound with the rubber used, and as the rubber ages these articles of adulteration will become loosened and detach themselves in small portions from the rubber and will be found on the inside of the rubber bulbs in a powdered form, and in using ordinary medicine-droppers this powder frequently becomes mixed with the liquid used and is inadvertently injected into the patient's eye, producing deleterious effects when used as an eye-pipette, and frequently destroys the medicinal properties when used as a medicine-dropper.

The object of my invention is to prevent the liquid contained in the barrel from entering the rubber cap, as it is apt to do when the barrel is inverted or is too full to contain the liquid itself.

In the accompanying drawings, Figure 1 is a perspective view of the dropper. Fig. 2 is a longitudinal sectional view showing the valve in section. Fig. 3 is a detail view of a particular form of valve.

A represents the barrel of the dropper, provided with a tapering point B. A globular-shaped extension A' at the upper extremity is also shown. The cap C is of rubber or other suitable material, and is adjusted and secured to the upper extremity of the barrel A by the ring D of the cap C fitting tightly over the rim or flange E of the barrel A.

F is the stopper or cork, of rubber or other suitable material, provided with two vertical orifices through the same, each ending in a nipple G and G' on opposite ends of the stopper F to each other, and provided with the lips H H'. In the valve shown a small slit is cut in the closed end of each of these nipples G G', which makes a valve of each orifice. Air-pressure on the inside of the orifice will cause the lips to open to let the air pass through; but air-pressure from the outside of the orifice will cause the lips to close tighter. It will be seen that there are two of these valves shown, one of which is used in expelling the air from the cap C to the barrel A, and the other is used in its return from the barrel A to the cap C. When the cap or bulb C is compressed, the air is expelled from its interior through the valve G into the barrel A, which expels a portion of the air from the barrel A. The point B of the barrel A is then inserted into the liquid to be used, and the cap or bulb C is then allowed to expand, which causes a portion of the air in the barrel A to return to the cap C, thus causing a partial vacuum in the barrel A, which is relieved by a portion of the liquid being drawn up into it. The dropping of the medicine is then performed by slightly compressing the cap C until the required number of drops have been expelled from the point of the dropper in the usual manner.

I usually provide a bulb or expansion A' in the barrel A to increase the internal area of the said barrel A, so that the area may be greater than the area of the interior of the cap C, as otherwise the liquid of necessity must have a tendency to be drawn into the cap C against the valves.

I have shown a desirable form of double valve; but I do not limit myself to this specific form, as other forms of valves may be employed.

The point of the dropper may be made straight, as in the drawings, or it may be slightly bent for convenience in using, or it may be constructed with a small bulb on the end, to be used as an eye-pipette, as is used in in that class of medicine-droppers.

Having thus described my invention, what I claim, and desire to secure by Letters Patent, is—

1. A medicine-dropper provided with a double valve, each orifice adapted to open in opposite directions, in combination with a barrel and compression-cap, said valve located at or near the connection of the barrel with the compression-cap, substantially as hereinbefore set forth and described.

2. In a medicine-dropper, in combination with a compression-cap C and barrel A, a double valve F, provided with nipples G G' on opposite sides, and lips H H', provided in the ends of the nipples G G', respectively, substantially as hereinbefore set forth and described.

3. In a medicine-dropper, the compression-cap C and barrel A, in combination with the double valve F, provided with the opposite nipples G G', adapted to open in opposite directions, each of said nipples being provided, respectively, with the lips H H', adapted to open by pressure from within and to close with pressure from without, substantially as hereinbefore set forth and described.

In witness whereof I have hereunto set my hand this 15th day of November, A. D. 1889.

WALTER F. WARE.

Witnesses:
T. H. BOARDMAN,
R. M. FLEISCHMANN.